US010840702B2

(12) United States Patent
Ding et al.

(10) Patent No.: US 10,840,702 B2
(45) Date of Patent: Nov. 17, 2020

(54) DIRECT CURRENT POWER GRID VOLTAGE CONTROL METHOD

(71) Applicants: NR ELECTRIC CO., LTD, Jiangsu (CN); NR ENGINEERING CO., LTD, Jiangsu (CN)

(72) Inventors: Jiudong Ding, Jiangsu (CN); Yu Lu, Jiangsu (CN); Yunlong Dong, Jiangsu (CN); Gang Li, Jiangsu (CN); Zhaoqing Hu, Jiangsu (CN)

(73) Assignees: NR ELECTRIC CO., LTD, Jiangsu (CN); NR ENGINEERING CO., LTD, Jiangsu (CN)

( * ) Notice: Subject to any disclaimer, the term of this patent is extended or adjusted under 35 U.S.C. 154(b) by 29 days.

(21) Appl. No.: 16/081,873

(22) PCT Filed: Mar. 29, 2017

(86) PCT No.: PCT/CN2017/078626
§ 371 (c)(1),
(2) Date: Aug. 31, 2018

(87) PCT Pub. No.: WO2017/167206
PCT Pub. Date: Oct. 5, 2017

(65) Prior Publication Data
US 2019/0341777 A1    Nov. 7, 2019

(30) Foreign Application Priority Data
Mar. 30, 2016    (CN) .......................... 2016 1 0190067

(51) Int. Cl.
*H02J 1/14* (2006.01)
*H02J 1/04* (2006.01)
*H02J 1/08* (2006.01)

(52) U.S. Cl.
CPC ................. *H02J 1/14* (2013.01); *H02J 1/04* (2013.01); *H02J 1/082* (2020.01)

(58) Field of Classification Search
CPC ........ H02J 1/14; H02J 1/04; H02J 1/00; H02J 2991/008; H02J 9/00; H02J 9/04
(Continued)

(56) References Cited

U.S. PATENT DOCUMENTS 5,130,561 A * 7/1992 Elliott ..................... H02M 1/14
                                                               307/31
6,307,757 B1 * 10/2001 Porter .................. H02M 1/088
                                                             363/21.01
(Continued)

FOREIGN PATENT DOCUMENTS

CN          102969733 A       3/2013
CN          103178539 A       6/2013
(Continued)

OTHER PUBLICATIONS

ISA/CN, International Search Report dated May 26, 2017 in International Patent Application No. PCT/CN2017/078626, total 4 pages with English translation.

*Primary Examiner* — Rexford N Barnie
*Assistant Examiner* — Jagdeep S Dhillon
(74) *Attorney, Agent, or Firm* — Masuvalley & Partners

(57) ABSTRACT

Provided in the present invention is a direct current power grid voltage control method, dividing control of a direct current power grid voltage into three processes, namely natural voltage regulation, first voltage regulation and second voltage regulation; the converter stations in the direct current power grid are divided into three types, namely power regulation converter stations, auxiliary voltage regulation converter stations, and voltage regulation converter stations, on the basis of whether the converter station has a voltage regulation capacity, the power regulation converter stations operating in a fixed power control mode, the voltage regulation converter stations operating in a fixed voltage control mode or an auxiliary voltage control mode, and the auxiliary voltage control converter stations operating in the auxiliary voltage control mode; all the converter stations in the direct current power grid participate in natural voltage regulation, the auxiliary voltage regulation converter stations and the voltage regulation converter stations partici-
(Continued)

pate in first voltage regulation, and the voltage regulation converter stations participate in second voltage regulation; by means of a combination of the three voltage regulation processes, accurate control of the direct current voltage can be implemented in a steady state, and direct current voltage change can be suppressed in a transient state.

4 Claims, 2 Drawing Sheets

(58) Field of Classification Search
USPC .................. 307/31, 33, 43, 71, 77, 66, 86
See application file for complete search history.

(56) References Cited

U.S. PATENT DOCUMENTS

| | | | | |
|---|---|---|---|---|
| 7,564,706 B1* | 7/2009 | Herbert | ..................... | G05F 1/70 |
| | | | | 323/222 |
| 9,876,393 B2* | 1/2018 | Dong | ................... | H02J 13/0003 |
| 2004/0075600 A1* | 4/2004 | Vera | ........................ | H02J 1/102 |
| | | | | 341/166 |
| 2010/0052425 A1* | 3/2010 | Moore | .............. | H01L 31/02021 |
| | | | | 307/52 |
| 2011/0316346 A1* | 12/2011 | Porter | ..................... | H02J 3/383 |
| | | | | 307/82 |
| 2012/0049634 A1* | 3/2012 | Babb | ...................... | H02M 7/08 |
| | | | | 307/82 |
| 2014/0285010 A1* | 9/2014 | Cameron | .................. | H02J 7/35 |
| | | | | 307/29 |
| 2016/0308359 A1* | 10/2016 | Dong | .................. | H02J 13/0003 |

FOREIGN PATENT DOCUMENTS

| | | | | | |
|---|---|---|---|---|---|
| CN | 104022522 A | * | 6/2014 | ................ | H02J 3/36 |
| CN | 104022522 A | * | 9/2014 | | |
| CN | 104022522 A | | 9/2014 | | |
| CN | 104104102 A | | 10/2014 | | |
| CN | 105870909 A | | 8/2016 | | |

* cited by examiner

DIRECT CURRENT POWER GRID VOLTAGE CONTROL METHOD

RELATED APPLICATIONS

This application is the U.S. National Phase of and claims priority to International Patent Application No. PCT/CN2017/078626, International Filing Date Mar. 29, 2017, entitled Direct Current Power Grid Voltage Control Method; which claims benefit of Chinese Patent Application No. 201610190067.5 filed Mar. 30, 2016; both of which are incorporated herein by reference in their entireties.

BACKGROUND OF THE INVENTION

Field of the Invention

The present invention relates to the field of direct current power grids, and in particular, to a direct current power grid voltage control method.

Related Art

With continuous development of electrical and electronics technology, flexible direct current power transmission and distribution technology is the new-generation direct current power transmission and distribution technology and can resolve various problems that exist in current alternating current power transmission and distribution technology. As the scale of direct current power transmission increases, a direct current power grid becomes possible.

In a direct current power grid, the role of direct current voltage may be equivalent to the role of frequency in an alternating current power grid. The stability of direct current voltage directly determines the stability of a direct current load flow, and determines the safe and stable operation of the direct current power grid. Therefore, it is very important to control direct current voltage in the direct current power grid. In a conventional two-terminal flexible direct current system, one converter station controls direct current voltage, and another converter station controls another variable such as active power, alternating current frequency or alternating current voltage. If the converter station for controlling direct current voltage fails and a direct current voltage control capability is consequently lost, direct current voltage becomes unstable and results in the outage of the two-terminal flexible direct current system. Therefore, the system has relatively low reliability. A plurality of converter stations usually have a direct current voltage control capability in the direct current power grid. According to a quantity of converter stations that participate in control of direct current voltage at a same moment, current common direct current voltage control methods may include a single-point voltage control method and a multi-point voltage control method.

The single-point voltage control method uses a single converter station as a direct current voltage control station. Only one converter station controls direct current voltage at a same moment. Therefore, accurate control of the direct current voltage can be implemented. If the converter station fails or power exceeds the limits to lose a direct current voltage control capability, another converter station having a direct current voltage control capability takes over direct current voltage control right. On the basis of whether there is dependence on communication, takeover methods are categorized into a communication-based deviation-less control method and non-communication-based deviation control method. The deviation-less control method depends on rapid inter-station communication to implement transfer of direct current voltage control right. When the direct current voltage control station fails and stops operating, a backup converter station implements the takeover of direct current voltage control right by using rapid inter-station communication. However, this method requires very high speed and reliability of inter-station communication. If there is a relatively long delay in communication, the takeover of direct current voltage control right may fail to be implemented in time after the direct current voltage control station fails, resulting in the outage of the entire direct current system. Moreover, when the scale of the direct current power grid gradually increases, the quantity of backup converter stations keeps growing. In this case, it becomes very complex to set priorities for direct current voltage control, and a high-speed communications network gradually becomes more complex. These defects make it particularly difficult to promote and apply the communication-based deviation-less control method in direct current power grids.

Direct current voltage deviation control is a control manner that does not require inter-station communication. After a direct current voltage control station fails and stops operating, a backup direct current voltage control station can detect a relatively large deviation in a direct current voltage and turns to the fixed-direct current voltage control mode, to ensure the stability of direct current voltage. However, a plurality of backup converter stations need a plurality of priorities, and therefore complexity of controller design is increased. The quantity of backup converter stations grows as the scale of the direct current power grid gradually increases. Direct current voltage in the direct current power grid is restricted to a particular operation range. Therefore, a deviation cannot exceed the operation range of direct current voltage. This restricts a stage difference and a stage quantity in deviation control. These defects make it particularly difficult to promote and apply the deviation control method in direct current power grids.

In the multi-point voltage control method, a plurality of converter stations control direct current voltage in a direct current power grid at a same moment. A common multi-point voltage control method is a slope voltage control method. In this method, active power outputs of a plurality of slope voltage control converter stations are related to the impedance in a direct current transmission line and respective slopes of the slope voltage control converter stations. Neither direct current voltage nor active power can be accurately controlled.

SUMMARY OF THE INVENTION

An objective of the present invention is to provide a direct current power grid voltage control method, so that a direct current voltage can be accurately controlled in a steady state, and direct current voltage deviation can be suppressed in a transient state.

To achieve the above objective, the present invention adopts the follows solution:

In a direct current power grid voltage control method, control of a direct current power grid voltage is divided into three processes, namely natural voltage regulation, first voltage regulation and second voltage regulation; the converter stations in the direct current power grid are divided into three types, namely power regulation converter stations, auxiliary voltage regulation converter stations, and voltage regulation converter stations, on the basis of whether the converter station has a voltage regulation capacity, the power regulation converter stations operating in a fixed power control mode, the voltage regulation converter stations operating in a fixed voltage control mode or an auxiliary voltage control mode, and the auxiliary voltage control converter stations operating in the auxiliary voltage control mode; all the converter stations in the direct current power grid participate in natural voltage regulation, the auxiliary voltage regulation converter stations and the voltage regulation converter stations participate in first voltage regulation, and the voltage regulation converter stations participate in second voltage regulation.

In the natural voltage regulation, capacitor energy storage in the converter stations in the direct current power grid is used to bear change of load of the direct current power grid first, when power in the direct current power grid is unbalanced, direct current voltage deviation gradually increases with time, and a process of the natural voltage regulation is naturally completed and does not need any adjustment measure.

In the first voltage regulation, the converter stations operating in the auxiliary voltage control mode is used to participate in adjustment of direct current voltage, to eventually enable direct current voltage to form deviation, and the first voltage regulation is automatically completed depending on a controller of a converter station and does not need intervention of an external regulation department.

In the second voltage regulation, the converter stations operating in the fixed-direct current voltage control mode or the converter stations operating in the auxiliary voltage control mode are used to participate in adjustment of direct current voltage, to eventually implement accurate control of the direct current voltage, and a controller of the second voltage regulation is mounted inside a converter station or at an external regulation department.

An implementation method of the auxiliary voltage control mode is:

(1) detecting direct current voltage $U_{dc}$;

(2) calculating deviation $\Delta U = U_{dc} - U_{rate}$ between the direct current voltage $U_{dc}$ and rated direct current voltage $U_{rate}$;

(3) comparing $\Delta U$ with fixed voltage deviation values $U_{setH}$ and $U_{setL}$ ($U_{setH} > U_{setL}$), where when $U_{setL} < \Delta U < U_{setH}$, $\Delta U_{mod} = 0$, when $\Delta U > U_{setH}$, $\Delta U_{mod} = \Delta U - U_{setH}$, and when $\Delta U < U_{setL}$, $\Delta U_{mod} = \Delta U - U_{setL}$;

(4) calculating a power instruction deviation value $\Delta P = K * \Delta U_{mod}$; and (5) calculating a power instruction $P_{ref} = P_{order} - \Delta P$ of a power controller according to a power instruction $P_{order}$ delivered by an upper-layer controller and the power instruction deviation value $\Delta P$.

By means of the above solution, the present invention is advantageous in the following aspects:

(1) Direct current voltage and power can be accurately controlled in a steady state.

(2) Direct current voltage change can be suppressed in a transient state.

(3) A high-speed communications channel does not need to be configured.

DETAILED DESCRIPTION OF THE INVENTION

Figure 1:
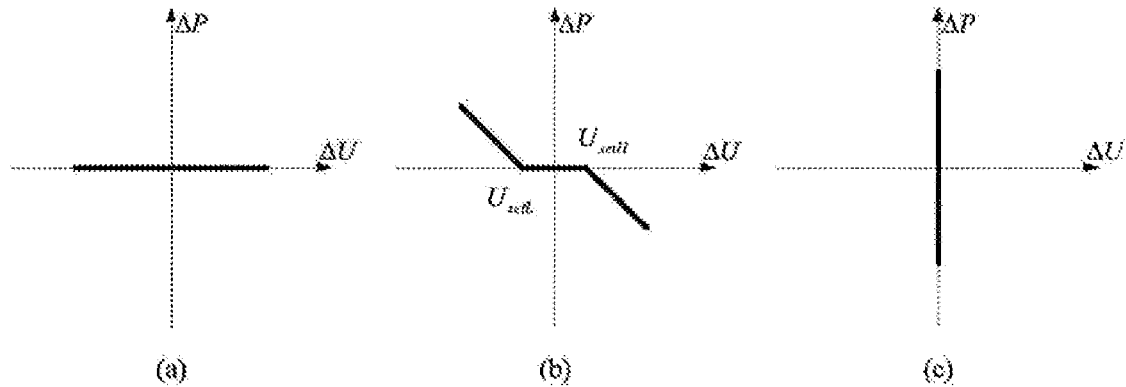
FIG. 1 shows typical control modes of a direct current power grid converter, where FIG. (a) is a fixed power control mode, FIG. (b) is an auxiliary voltage control mode, and FIG. (c) is a fixed voltage control mode.

The technical solution of the present invention is described below in detail with reference to the accompanying drawings and specific embodiments.

In a direct current power grid voltage control method, control of a direct current power grid voltage is divided into three processes, namely natural voltage regulation, first voltage regulation and second voltage regulation; the converter stations in the direct current power grid are divided into three types, namely power regulation converter stations, auxiliary voltage regulation converter stations, and voltage regulation converter stations, on the basis of whether the converter station has a voltage regulation capacity, the power regulation converter stations operating in a fixed power control mode, the voltage regulation converter stations operating in a fixed voltage control mode or an auxiliary voltage control mode, and the auxiliary voltage control converter stations operating in the auxiliary voltage control mode; all the converter stations in the direct current power grid participate in natural voltage regulation, the auxiliary voltage regulation converter stations and the voltage regulation converter stations participate in first voltage regulation, and the voltage regulation converter stations participate in second voltage regulation.

In the natural voltage regulation, capacitor energy storage in the converter stations in the direct current power grid is used to bear change of load of the direct current power grid first, when power in the direct current power grid is unbalanced, direct current voltage deviation gradually increases with time, and a process of the natural voltage regulation is naturally completed and does not need any adjustment measure.

In the first voltage regulation, the converter stations operating in the auxiliary voltage control mode is used to participate in adjustment of direct current voltage, to eventually enable direct current voltage to form deviation, and the first voltage regulation is automatically completed depending on a controller of a converter station and does not need intervention of an external regulation department.

In the second voltage regulation, the converter stations operating in the fixed-direct current voltage control mode or the converter stations operating in the voltage auxiliary control mode are used to participate in adjustment of direct current voltage, to eventually implement accurate control of the direct current voltage, and a controller of the second voltage regulation is mounted inside a converter station or at an external regulation department.

An implementation method of the auxiliary voltage control mode is:

(1) detecting direct current voltage $U_{dc}$;

(2) calculating deviation $\Delta U = U_{dc} - U_{rate}$ between the direct current voltage $U_{dc}$ and rated direct current voltage $U_{rate}$;

(3) comparing $\Delta U$ with fixed voltage deviation values $U_{setH}$ and $U_{setL}$ ($U_{setH} > U_{setL}$), where when $U_{setL} < \Delta U < U_{setH}$, $\Delta U_{mod} = 0$, when $\Delta U > U_{setH}$, $\Delta U_{mod} = \Delta U - U_{setH}$, and when $\Delta U < U_{setL}$, $\Delta U_{mod} = \Delta U - U_{setL}$;

(4) calculating a power instruction deviation value $\Delta P = K * \Delta U_{mod}$; and (5) calculating a power instruction $P_{ref}=P_{order}-\Delta P$ of a power controller according to a power instruction $P_{order}$ delivered by an upper-layer controller and the power instruction deviation value $\Delta P$.

FIG. 1 shows typical control modes of a direct current power grid converter, where FIG. (a) is a fixed power control mode, FIG. (b) is an auxiliary voltage control mode, and FIG. (c) is a fixed voltage control mode.

Figure 2:
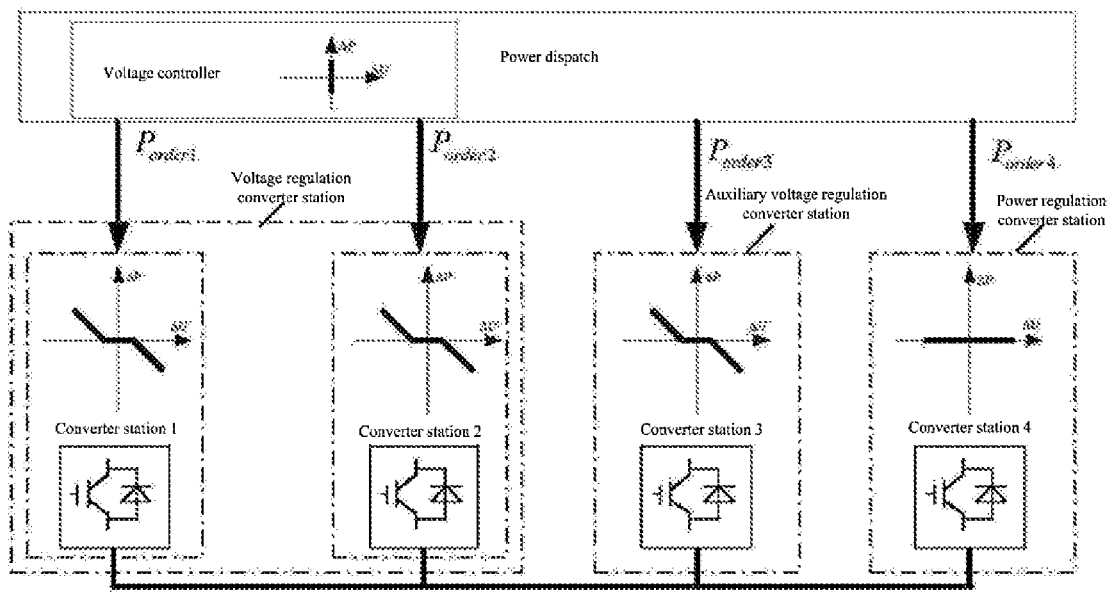
FIG. 2 is Implementation Solution 1 of direct current power grid voltage control.

There can only be one fixed voltage controller in a direct current network. The controller may be mounted in an upper-layer controller such as power dispatch or may be mounted inside a converter station. In a direct current power grid shown in FIG. 2, a voltage controller is mounted in a power dispatch system. A converter station 1 and a converter station 2 are voltage regulation converter stations. The voltage regulation converter stations operate in the auxiliary voltage control mode and receive a power instruction delivered by the voltage controller. A converter station 3 is an auxiliary voltage regulation converter station, operates in the auxiliary voltage control mode, and receives a power instruction of power dispatch. A converter station 4 is a power regulation converter station, operates in the fixed power control mode, and receives a power instruction of power dispatch. When load of the direct current power grid changes, capacitor energy storage of the four converter stations first redresses power imbalance, and as a result direct current voltage gradually deviates. Such a process is a process of the natural voltage regulation. If the voltage controller has a relatively slow adjustment speed or a relatively long communication delay, when direct current voltage deviation reaches a particular degree, the converter station 1, the converter station 2, and the converter station 3 operating in the auxiliary voltage control mode automatically adjust respective power reference values $P_{ref}$ to keep power balance to suppress further direct current voltage deviation. Such a process is a process of the first voltage regulation. The first voltage regulation cannot implement accurate control of the direct current voltage. After a period of time, the voltage controller starts to automatically change power instructions of the converter station 1 and the converter station 2, to implement accurate control of the direct current voltage. At the same time, a power reference value $P_{ref3}$ of the converter station 3 returns to $P_{order3}$. Such a process is a process of the second voltage regulation. If the adjustment speed of the voltage controller is sufficiently fast and the communication delay is sufficiently short, the process of the second voltage regulation exerts an effect before the process of the first voltage regulation does. The voltage controller changes $P_{order1}$ and $P_{order2}$ to keep power balance, so as to implement accurate control of the direct current voltage.

Figure 3:
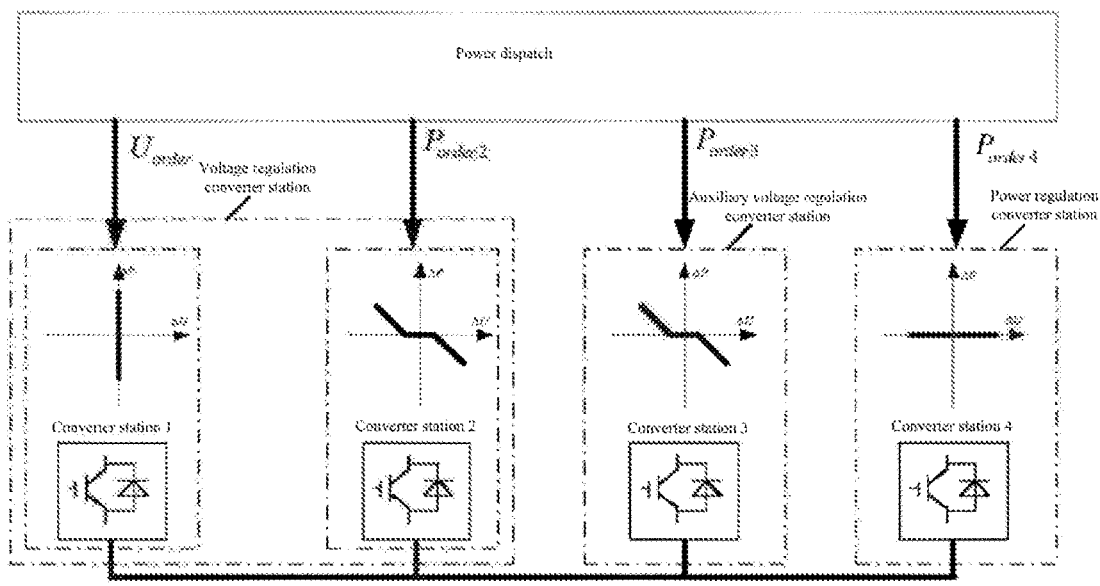
FIG. 3 is Implementation Solution 2 of direct current power grid voltage control.

In a direct current power grid shown in FIG. 3, a voltage controller is mounted inside a converter station. A converter station 1 and a converter station 2 are voltage regulation converter stations. The converter station 1 operates in a fixed voltage control mode. The converter station 2 operates in an auxiliary voltage control mode. The converter station 2 receives a power instruction of a power dispatch. A converter station 3 is an auxiliary voltage regulation converter station, operates in the auxiliary voltage control mode, and receives a power instruction of power dispatch. A converter station 4 is a power regulation converter station, operates in a fixed power control mode, and receives a power instruction of power dispatch. When load of the direct current power grid changes, capacitor energy storage of the four converter stations first redresses power imbalance, and as a result direct current voltage gradually deviates. Such a process is a process of the natural voltage regulation. The voltage controller mounted inside the converter station has a relatively short communication delay and a relatively fast adjustment speed. The voltage controller changes $P_{order1}$ and $P_{order2}$ to keep power balance, so as to implement accurate control of the direct current voltage. When the converter station 1 fails and stops operating, power of the direct current power grid may be no longer balanced. The capacitor energy storage of the four converter stations first redresses power imbalance, and as a result direct current voltage gradually deviates. Such a process is a process of the natural voltage regulation. The converter station 2 takes over voltage control right by means of communication. If a communication delay is relatively long, when direct current voltage deviation reaches a particular degree, the converter station 2 and the converter station 3 operating in the auxiliary voltage control mode automatically adjust respective power reference values $P_{ref}$ to keep power balance, so as to suppress further direct current voltage deviation. Such a process is a process of the first voltage regulation. The first voltage regulation cannot implement accurate control of the direct current voltage. After a period of time, the converter station 2 takes over voltage control right and switches to the fixed voltage control mode, so as to implement accurate control of the direct current voltage. At the same time, a power reference value $P_{ref3}$ of the converter station 3 returns to $P_{order3}$ again. Such a process is a process of the second voltage regulation. If the communication delay is sufficiently short, the converter station 2 already takes over voltage control right before the process of the first voltage regulation exerts an effect, and the process of the second voltage regulation already exerts an effect, so as to implement accurate control of the direct current voltage.

The foregoing embodiments are only used to describe the technical concept of the present invention and cannot be used to limit the protection scope of the present invention. Any change made on the basis of the technical solution according to the technical concept provided in the present invention shall fall within the protection scope of the present invention.

What is claimed is:

1. A direct current power grid voltage control method, characterized in that:
    dividing control of a direct current power grid voltage into three processes:
    a natural voltage regulation process participated by all converter stations in the direct current power grid and naturally completed by using a capacitor energy storage in all the converter stations to naturally adjust a direct current voltage in the direct current power grid,
    a first voltage regulation process, and a second voltage regulation process;
    the converter stations in the direct current power grid are divided into three types:
    power regulation converter stations, auxiliary voltage regulation converter stations, and voltage regulation converter stations, on the basis of whether the converter stations have a voltage regulation capacity;
    the power regulation converter stations operating in a fixed power control mode, the auxiliary voltage regulation converter stations operating in an auxiliary voltage control mode, and the voltage regulation converter stations operating in a fixed voltage control mode or the auxiliary voltage control mode; and
    the auxiliary voltage regulation converter stations and the voltage regulation converter stations participate in the first voltage regulation process, and the voltage regulation converter stations participate in the second voltage regulation process.

2. The direct current power grid voltage control method according to claim 1, characterized in that:
in the first voltage regulation process, specifically, the converter stations operating in the auxiliary voltage control mode is used to adjust direct current voltage in the direct current power grid, to enable direct current voltage to form deviation, and the first voltage regulation process is completed depending on a controller of the converter stations.

3. The direct current power grid voltage control method according to claim 1, characterized in that:
in the second voltage regulation process, specifically, the converter stations operating in the fixed voltage control mode or the converter stations operating in the voltage auxiliary control mode are used to adjust direct current voltage in the direct current power grid, to implement accurate control of the direct current voltage, and a controller of the second voltage regulation process is mounted inside the converter stations or at an external regulation department.

4. The direct current power grid voltage control method according to claim 1, characterized in that:
an implementation method of the auxiliary voltage control mode is:
(1) detecting direct current voltage $U_{dc}$;
(2) calculating deviation $\Delta U = U_{dc} - U_{rate}$ between the direct current voltage $U_{dc}$ and rated direct current voltage $U_{rate}$;
(3) setting two different fixed voltage deviation values $U_{setH}$ and $U_{setL}$, $U_{setH} > U_{setL}$, and comparing $\Delta U$ with $U_{setH}$ and $U_{setL}$, wherein when $U_{setL} < \Delta U < U_{setH}$, $\Delta U_{mod} = 0$, when $\Delta U > U_{setH}$, $\Delta U_{mod} = \Delta U - U_{setH}$, and when $\Delta U < U_{setL}$, $\Delta U_{mod} = \Delta U - U_{setL}$;
(4) calculating a power instruction deviation value $\Delta P = K * \Delta U_{mod}$, wherein K is a proportional coefficient; and
(5) calculating a power instruction value Pref=Porder−$\Delta P$ of a power controller according to a power instruction value Porder delivered by an upper-layer controller and the power instruction deviation value $\Delta P$.

* * * * *